US008985777B2

(12) United States Patent
Akiba

(10) Patent No.: US 8,985,777 B2
(45) Date of Patent: Mar. 24, 2015

(54) CONTENT DISPLAY SYSTEM AND METHOD FOR DISPLAYING CONTENT

(71) Applicant: Tetsuya Akiba, Sodegaura (JP)

(72) Inventor: Tetsuya Akiba, Sodegaura (JP)

( * ) Notice: Subject to any disclaimer, the term of this patent is extended or adjusted under 35 U.S.C. 154(b) by 260 days.

(21) Appl. No.: 13/651,598

(22) Filed: Oct. 15, 2012

(65) Prior Publication Data

US 2013/0100495 A1 Apr. 25, 2013

(30) Foreign Application Priority Data

Oct. 19, 2011 (JP) ................................. 2011-229787

(51) Int. Cl.
   G03B 21/26 (2006.01)
   H04N 1/387 (2006.01)
   H04N 9/31 (2006.01)
   G09G 3/00 (2006.01)

(52) U.S. Cl.
   CPC ............. *H04N 1/3872* (2013.01); *G09G 3/001* (2013.01); *G09G 3/002* (2013.01); *G09G 2340/10* (2013.01); *H04N 9/3185* (2013.01)
   USPC ................... 353/30; 353/28; 353/69; 353/70; 353/122; 348/14.07

(58) Field of Classification Search
   CPC ................................ G03B 21/00; G03B 21/14
   USPC ............... 353/28, 30, 48, 50, 51, 69, 70, 122; 715/764, 733, 751, 778, 810, 835; 348/14.07, 743–747, 588
   See application file for complete search history.

(56) References Cited

U.S. PATENT DOCUMENTS

| 6,621,508 | B1 * | 9/2003 | Shiraishi et al. ............... 715/810 |
| 7,844,913 | B2 * | 11/2010 | Amano et al. ................ 715/769 |
| 8,452,783 | B2 * | 5/2013 | Yamamoto ..................... 707/754 |
| 2002/0041364 | A1 * | 4/2002 | Ioka ................................ 353/69 |
| 2011/0148754 | A1 * | 6/2011 | Inagaki et al. ................ 345/156 |
| 2012/0057061 | A1 * | 3/2012 | Osaka et al. ............... 348/333.1 |

FOREIGN PATENT DOCUMENTS

| JP | 2004-153770 A | 5/2004 |
| JP | 2004-294743 A | 10/2004 |
| JP | 2005-258162 A | 9/2005 |
| JP | 2009-200613 A | 9/2009 |
| JP | 2009-271134 A | 11/2009 |
| JP | 2011-30014 A | 2/2011 |
| JP | 2011-24819 A | 12/2011 |

* cited by examiner

*Primary Examiner* — Sultan Chowdhury
(74) *Attorney, Agent, or Firm* — Mattingly & Malur, PC

(57) ABSTRACT

Wallpaper serving as a screen and display content such as an image to be projected onto the wallpaper are created while maintaining their correlation. The created display content is projected on the wallpaper. The content display system creates a background image, which is a first image serving as a screen, and a second image for a predetermined area on the first image while maintaining their visual relationship, and forms a composite image of the second image on the first image by projecting the second image from a projector onto the predetermined area of the first image.

11 Claims, 19 Drawing Sheets

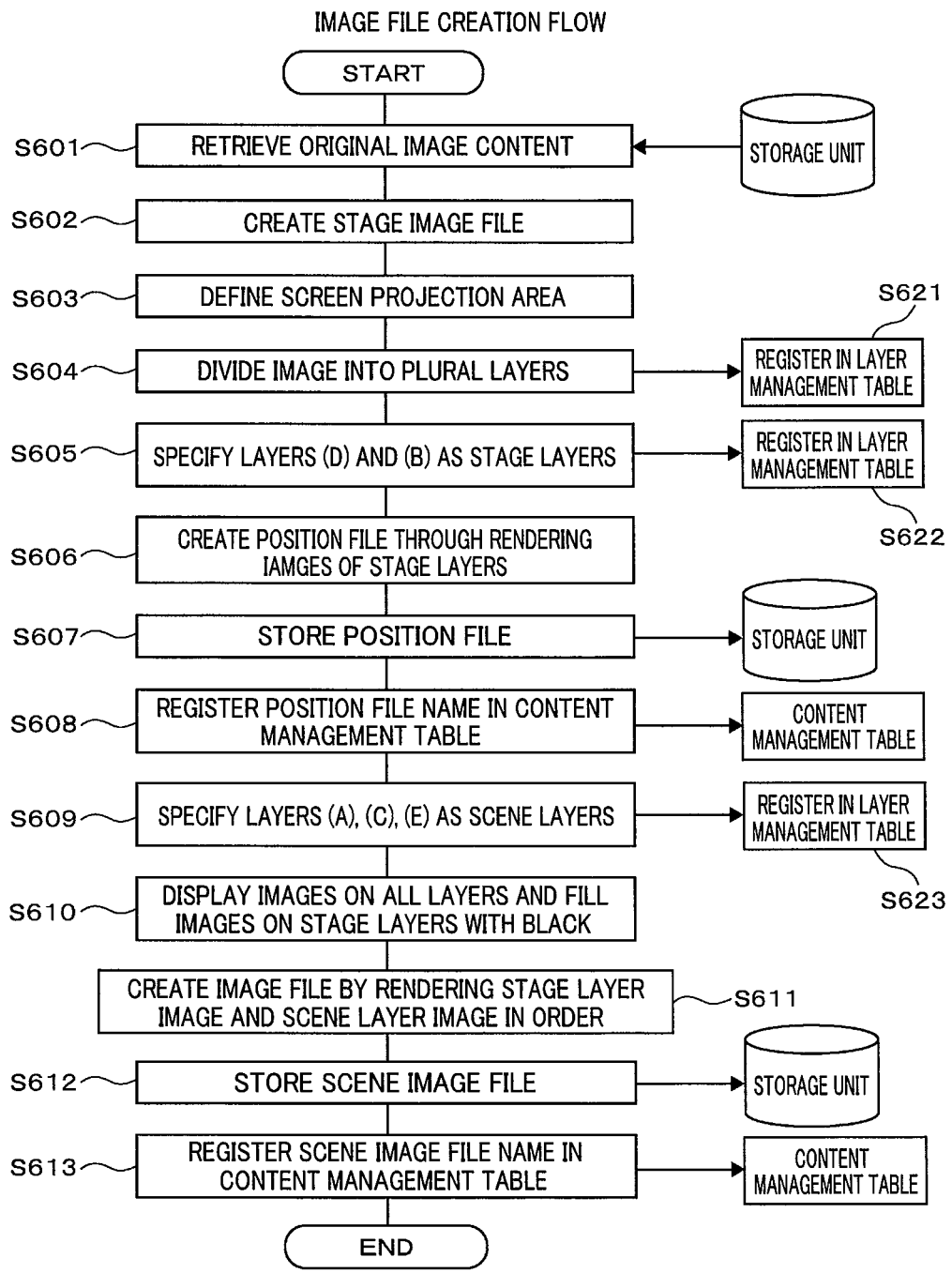

FIG. 7

LAYER MANAGEMENT TABLE

| IMAGE CONTENT IDENTIFICATION NAME | LAYER NAME | STAGE-LAYER SPECIFICATION FLAG | SCENE-LAYER SPECIFICATION FLAG |
|---|---|---|---|
| LANDSCAPE P | A |  | 1 |
|  | B | 1 |  |
|  | C |  | 1 |
|  | D | 1 |  |
|  | E |  | 1 |
| LANDSCAPE Q |  |  |  |
|  |  |  |  |
|  |  |  |  |

FIG. 8

CONTENT MANAGEMENT TABLE

| IMAGE CONTENT IDENTIFICATION NAME | STAGE IMAGE FILE NAME | POSITION FILE NAME | SCENE IMAGE FILE NAME |
|---|---|---|---|
| LANDSCAPE P | STAGE P | POSITION P | SCENE P |
| LANDSCAPE Q | STAGE Q | POSITION Q | SCENE Q |
|  |  |  |  |

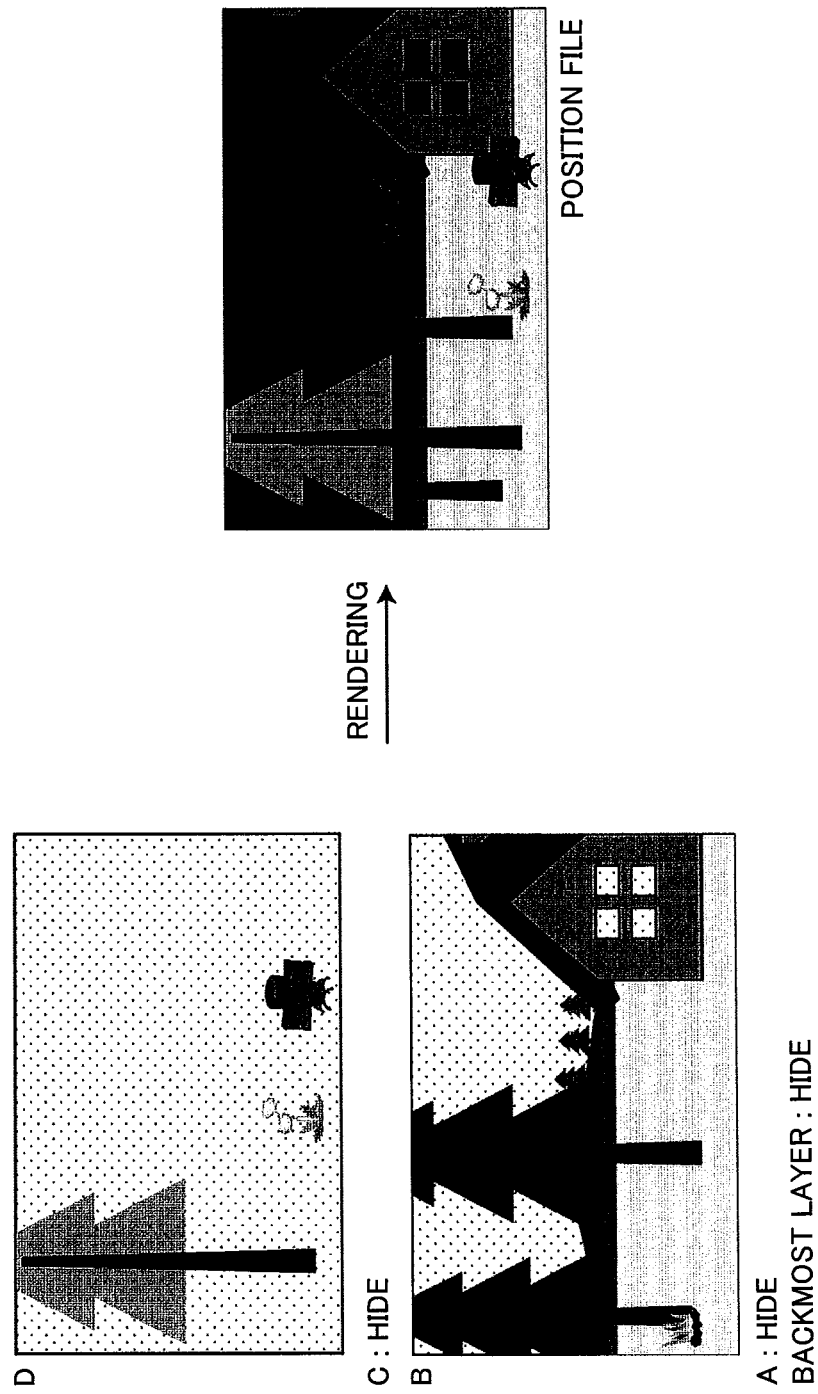

FIG. 9B
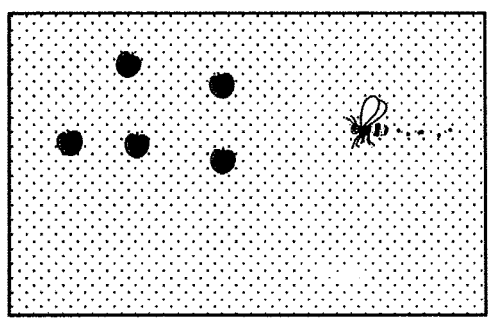
E
B
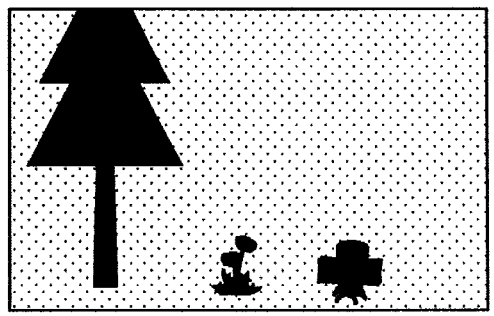
D
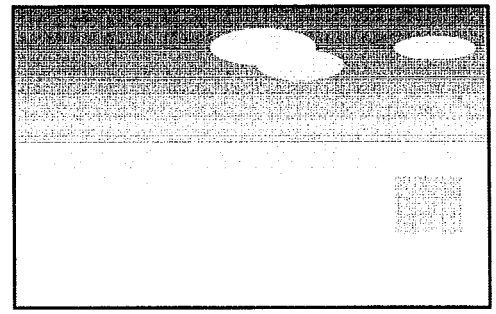
A
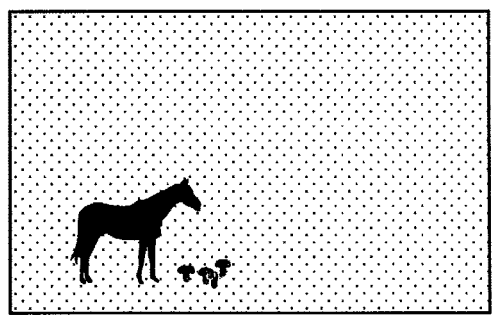
C
BACKMOST LAYER

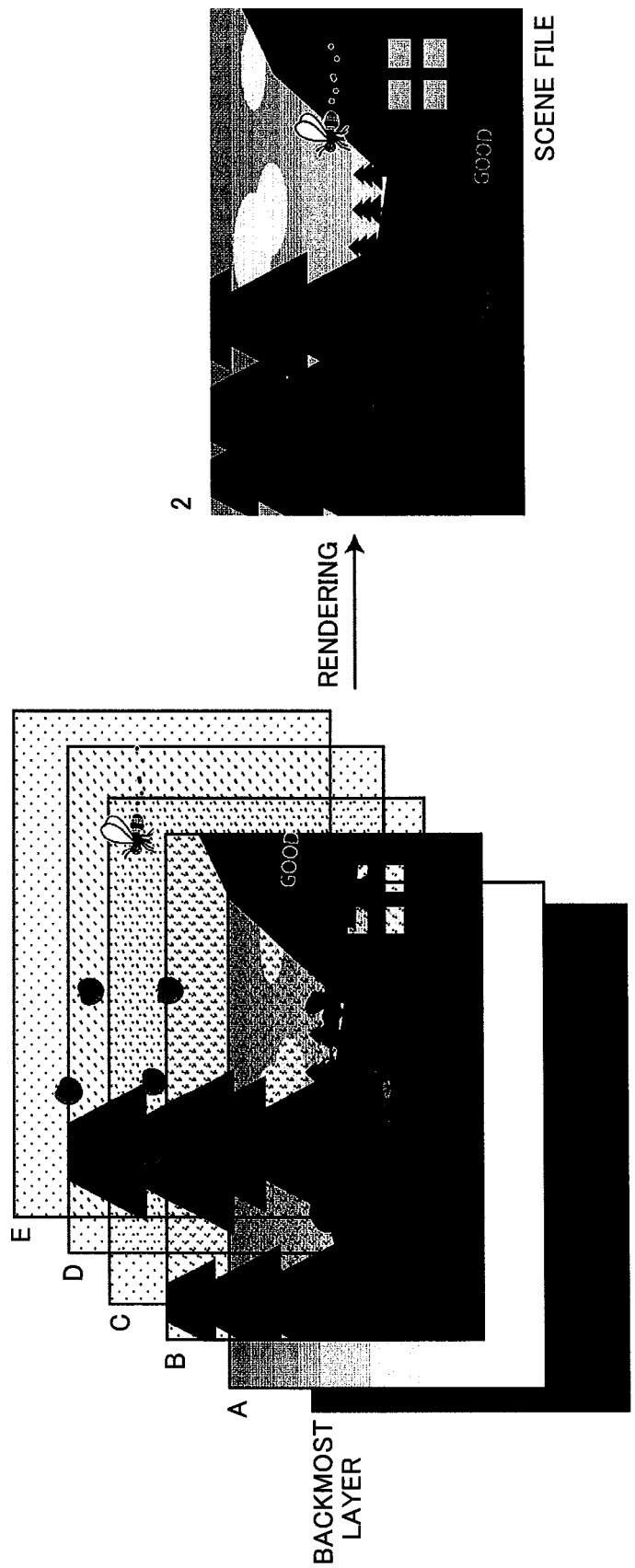

FIG. 11
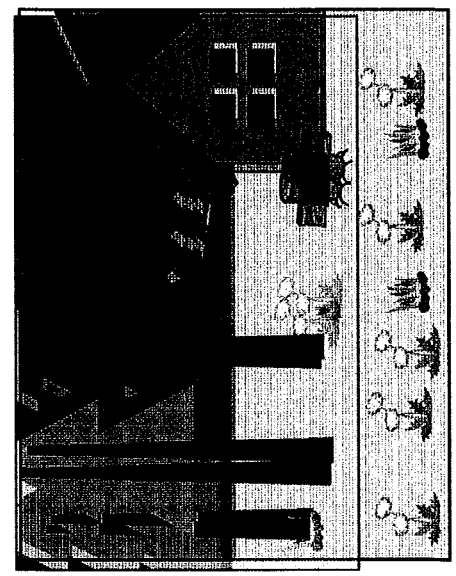
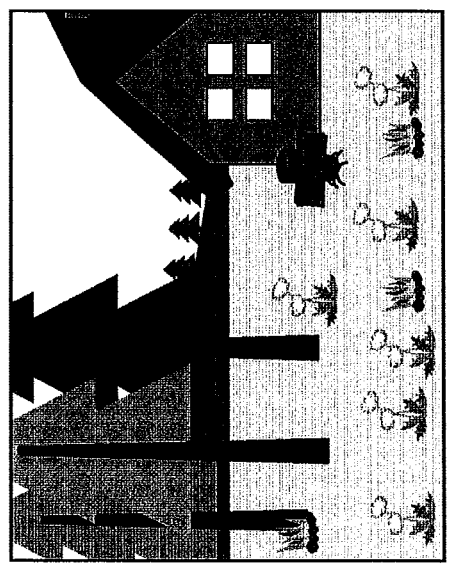
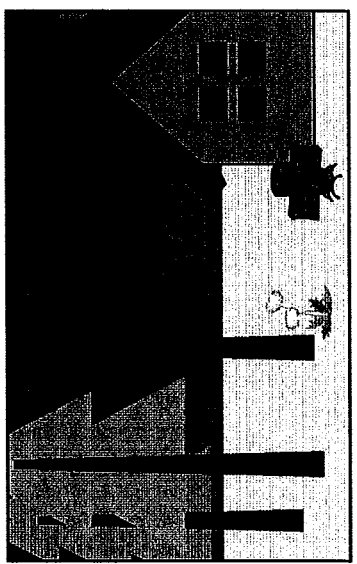

FIG. 14

LAYER MANAGEMENT TABLE

| IMAGE CONTENT IDENTIFICATION NAME | LAYER NAME | STAGE-LAYER SPECIFICATION FLAG | SCENE-LAYER SPECIFICATION FLAG | COMMENT (CONDITIONS FOR INTERCHANGE, ETC.) |
|---|---|---|---|---|
| LANDSCAPE P | A-1 | | 1 | 6 A.M. TO 6 P.M. |
| | A-2 | | | 6 P.M. TO 6 A.M. |
| | B | 1 | | |
| | C-1 | | 1 | 6 A.M. TO 6 P.M. |
| | C-2 | | | 6 P.M. TO 6 A.M. |
| | D | 1 | | |
| | E-1 | | 1 | 6 A.M. TO 6 P.M. |
| | E-2 | | | 6 P.M. TO 6 A.M. |
| | | | | |

FIG. 15

CONTENT MANAGEMENT TABLE

| IMAGE CONTENT IDENTIFICATION NAME | STAGE IMAGE FILE NAME | POSITION FILE NAME | SCENE IMAGE FILE NAME | CONDITIONS FOR CHANGE |
|---|---|---|---|---|
| LANDSCAPE P | STAGE P | POSITION P | DAYTIME P1 | 6 A.M. TO 6 P.M. |
| | | | NIGHTTIME P1 | 6 P.M. TO 6 A.M. |
| LANDSCAPE Q | STAGE Q | POSITION Q | SCENE Q | — |
| | | | | |

FIG. 19

CONTENT MANAGEMENT TABLE

| IMAGE CONTENT IDENTIFICATION NAME | STAGE IMAGE FILE NAME | POSITION FILE NAME | SCENE IMAGE FILE NAME | CONDITIONS FOR INTERCHANGE |
|---|---|---|---|---|
| LANDSCAPE P | STAGE P | POSITION P1 | DAYTIME P1 | 6 A.M. TO 6 P.M. |
| | | | NIGHTTIME P1 | 6 P.M. TO 6 A.M. |
| | | POSITION P2 | DAYTIME P2 | 6 A.M. TO 6 P.M. |
| | | | NIGHTTIME P2 | 6 P.M. TO 6 A.M. |
| LANDSCAPE Q | STAGE Q | POSITION Q | SCENE Q | – |

CONTENT DISPLAY SYSTEM AND METHOD FOR DISPLAYING CONTENT

BACKGROUND OF THE INVENTION

1. Field of the Invention

The present invention relates to a content display system and method for displaying content, and more particularly to a content display system that projects video or image content from a projector to display it on a screen, and a method for displaying the video or image content.

2. Description of the Related Art

Projection mapping has been known as a technique of projecting content such as video from a projector to display it on a wall of a building structure or a formed object, serving as a screen. The projection mapping has been recently drawing attention for its various visual effects with the use of optical illusion.

The inventors of the present invention have proposed a video display method relating to projection mapping in JP-A No. 2005-258162. The video display method employs a technique of forming a display area having roughly the same color and pattern as those of a surrounding area of the display area, while displaying a predetermined video within the display area and making the edge of a displayed video area inconspicuous.

In addition, JP-A No. 2011-30014 discloses a content editing/displaying system using a projector. The system selects at least two content data items arbitrarily selected from: data of stylized content relating to an event and stored in a first memory; data of original content provided from the organizer of the event and stored in a second memory; and data of new content containing images shot during the event and stored in a third memory. Then the system combines the selected content data items to form edited content and projects the edited content from a projector to display it on a screen.

The display method using a projector disclosed in JP-A No. 2005-258162 employs a technique to enhance the sense of unity of an object, such as a structure and a picture, on which a video image is displayed and the video image. This has been achieved by displaying only images, which are desired to be displayed, on the object without displaying the background image of the images and the edge of the video image area. However, JP-A No. 2005-258162 does not disclose the details of how to create the content, or images, to be projected from a projector.

Although JP-A No. 2011-30014 discloses the display system that composites a plurality of content items and projects the edited content, it lacks schemes to apply three-dimensional effects to composite content, or images.

Recent display systems, which combine a plurality of image content items and projects them, are required to replace a specific image content item with another image content item at regular time intervals. However, JP-A Nos. 2005-258162 and 2011-30014 do not disclose anything about changing some of a plurality of image content items to be combined to another content item and displaying the changed image content item.

SUMMARY OF THE INVENTION

The present invention has been made to provide a content display system and a content display method that create background display content, or an image, forming a screen and display content, or an image, to be projected on the background display content, while maintaining their correlation, and project the created display content to display it on the created background display content.

The present invention has been made to apply three-dimensional effects to the display content, or an image, with respect to the background image by creating a projection image file containing a plurality of selectively combined image layers.

The present invention also has been made to achieve a content display system and a content display method that can readily interchange the display content items to be projected on wallpaper where the background image is formed.

The content display system according to the present invention is preferably a content display system in which a projector projects image content or video content to display the content on a screen, including:

a creation processing unit creating first display content serving as the screen and creating second display content being projected by the projector onto a predetermined area of the first display content, the first display content and second display content being arranged while maintaining their visual relationship;

a storage unit storing the first display content and the second display content created by the creation processing unit;

a display processing unit retrieving the second display content from the storage unit and providing the retrieved second display content to the projector; and the projector projecting the second display content provided by the display processing unit onto the predetermined area of the first display content.

In a preferable example, the content display system further includes:

a print processing unit retrieving the first display content stored in the storage unit and printing the retrieved first display content with a printer to form a printed matter, wherein the printed matter of the first display content printed by the printer is affixed on an object such as a wall, a building structure and an exhibit, to form the screen.

In addition, the creation processing unit preferably crops display content from the predetermined area of the first display content and creates the second display content based on the cropped display content.

Preferably, the creation processing unit creates third display content that includes the display content in the predetermined area of the first display content, the storage unit stores the created third display content, the display processing unit retrieves the third display content stored in the storage unit and transfers the third display content to the projector, the projector projects the obtained third display content to the predetermined area of the first display content, the display processing unit further retrieves the second display content stored in the storage unit, replaces the third display content with the second display content, and transfers the second display content to the projector, and the projector projects the obtained second display content to the predetermined area of the first display content.

In a further preferable example, the creation processing unit creates a plurality of display content items as the second display content, the storage unit stores the plurality of created display content items as the second display content, and the display processing unit selectively retrieves a display content item from among the plurality of display content items stored in the storage unit at fixed time intervals counted by a timer, and transfers the retrieved display content item to the projector.

In a further preferable example, the first display content has a first predetermined area and a second predetermined area set thereon, the creation processing unit creates fourth display content relating to the first predetermined area and creates fifth display content relating to the second predetermined area, the display processing unit transfers the fourth display content to a first projector and transfers the fifth display content to a second projector, the first projector projects the obtained fourth display content to the first predetermined area, the second projector projects the obtained fifth display content to the second predetermined area, and composite display content items of the fourth display content and the fifth display content are formed on the first display content.

Preferably, the creation processing unit renders images of a plurality of layers making up the first display content to create images of stage layers making up the third display content, and the creation processing unit renders the images of the plurality of layers stacked on one another with use of the layers of the third display content as masks while maintaining their positional relationship in the top-to-bottom direction to create images of scene layers making up the second display content.

The method for displaying content according to the present invention is preferably a method for displaying content, the content being image or video display content projected by a projector to be displayed on a screen, the method including the steps of:

creating first display content serving as the screen;

creating second display content being projected by the projector onto a predetermined area of the first display content, the first display content and second display content maintaining their visual relationship; and forming composite display content of the second display content on the first display content by projecting the second display content onto the predetermined area of the first display content from the projector.

In a preferable example, the second display content is created based on display content cropped from the predetermined area of the first display content.

In a preferable example, the method for displaying content according to the present invention, the content being image or video display content projected by a projector to be displayed on a screen, including the steps of:

creating first display content serving as the screen;

creating second display content being projected by the projector onto a predetermined area of the first display content serving as the screen;

creating third display content that is made from display content in the predetermined area of the first display content;

projecting the third display content from the projector to the predetermined area of the first display content to compensate for misalignment; and replacing the third display content with the second display content to project the second display content to the predetermined area of the first display content.

According to the present invention, the content display system and the method can create background display content, or an image, forming a screen and display content, or an image, to be projected on the background display content while maintaining their correlation and can project the created display content to display it on the background display content.

In addition, the content display system and the method can create a projection image file by selectively combining the plurality of image layers, thereby applying three dimensional effects to the display content, or an image, to be projected to the background image.

Furthermore, the content display system and the method can readily interchange the display content items to be projected on the wallpaper on which the background image is formed.

BRIEF DESCRIPTION OF THE DRAWINGS

FIG. 6 is a flow chart showing the steps of creating a stage image file and a scene image file according to Embodiment 1;

FIG. 7 shows the structure of a layer management table according to Embodiment 1;

FIG. 8 shows the structure of a content management table according to Embodiment 1;

FIG. 9A depicts image files in the process of creating a stage image file and a scene image file and the process operations thereof according to Embodiment 1;

FIG. 9B depicts image files in the process of creating a stage image file and a scene image file and the process operations thereof according to Embodiment 1;

FIG. 9C depicts image files in the process of creating a stage image file and a scene image file and the process operations thereof according to Embodiment 1;

FIG. 11 depicts a background image and a position image file and alignment of the images according to Embodiment 1;

FIG. 14 shows the structure of a layer management table according to Embodiment 2;

FIG. 15 shows the structure of an image content management table according to Embodiment 2;

FIG. 19 shows the structure of an image content management table according to Embodiment 3.

DESCRIPTION OF THE PREFERRED EMBODIMENTS

With reference to the drawings, preferred embodiments of the present invention will be described.

Embodiment 1

Figure 1:
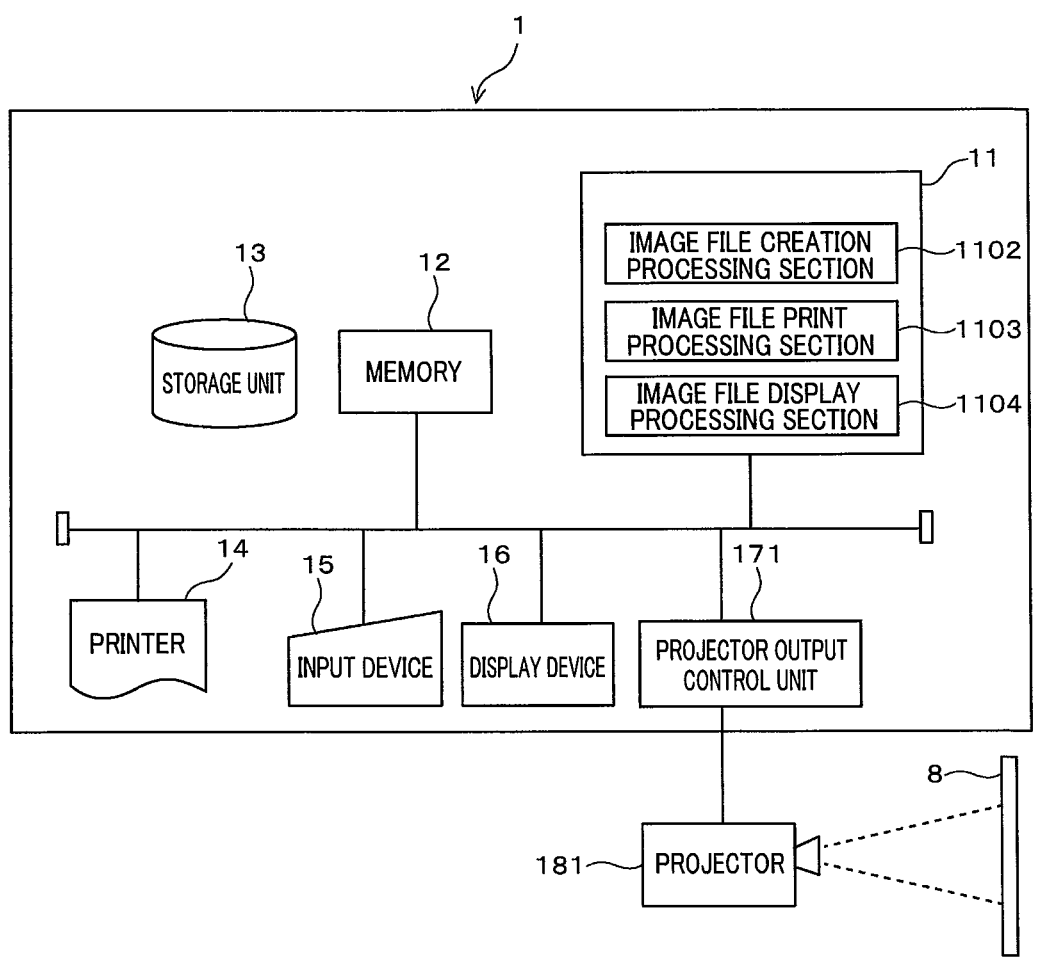
FIG. 1 illustrates the configuration of the entire image content display system according to Embodiment 1.

FIG. 1 shows the configuration of the entire image content display system as an example.

The image content display system mainly includes an image processor 1 that creates image files from content, such as images (including still images and moving images) and video, (hereinafter simply referred to as "image"), and performs printing and displaying processing to the created images, and a projector 181 that projects the images of the created image files to display them on a screen 8.

The image processor 1 is, for example, an information processor, such as PCs (personal computers) and servers, and includes a central processing unit (CPU) 11, a memory 12, a storage unit 13 or a hard disk, a printer 14, an input device 15, a display device 16, and a projector output control unit 171 for outputting image content to the projector 181.

The central processing unit 11 performs distinctive processing of Embodiment 1. Specifically, the central processing unit 11 runs an application program to create a file of a background image forming a screen based on an original image and to create a file of an image (simply referred to as an image file) to be projected. Then the central processing unit 11 prints out the background image with the printer 14, transfers the images of the created image files to the projector 181, which projects the images to display them on the screen 8. To execute the processes, functions achieved by the application program are referred to as an image file creation processing section 1102, an image file print processing section 1103, and an image file display processing section 1104.

The image file creation processing section 1102 mainly executes the processes of: creating a file of a background image (referred to as a stage image during the processes), serving as wallpaper, from an original image; creating a file of a position image to align a projection image with the background image; and creating an image of an image file to be projected from the projector 181 to the screen. In Embodiment 1, the original image itself serves as the background image. (Details of the processes for creating the image files will be described later with reference to the flow chart in FIG. 6).

Figure 2:
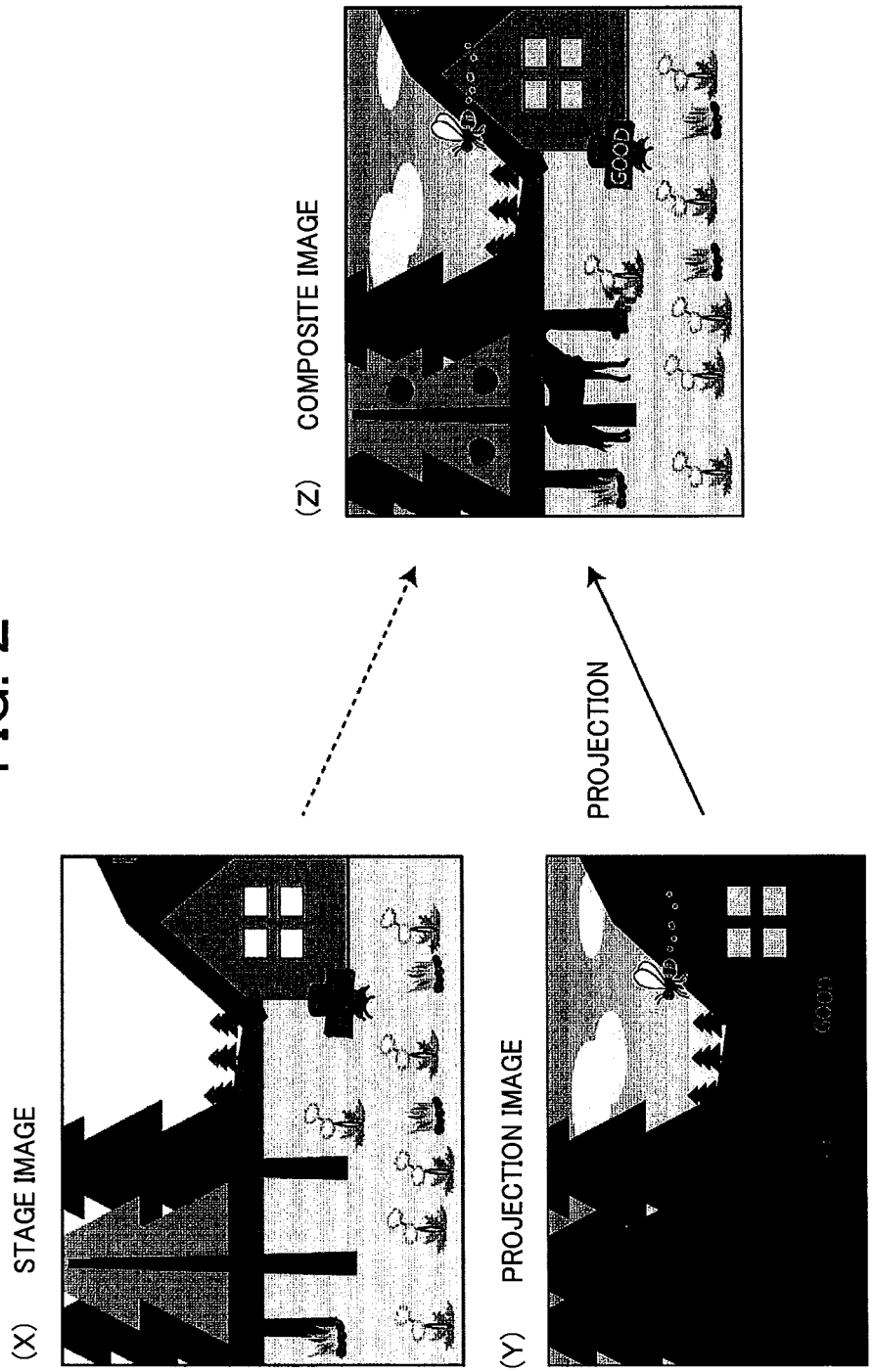
FIG. 2 shows composition of a background image and a projection image according to Embodiment 1.

The image file print processing section 1103 performs a process of printing the background image (or stage image), as shown in FIG. 2, with a printer 14. The printed matter is affixed on a wall of a building as wallpaper to form a screen 8. The image file display processing section 1104 transfers an image of a specified image file, serving as an image to be projected (simply referred to as "projection image") to a projector output control unit 171. These distinctive processes allow the projection image projected by the projector 181 to be superimposed on the background image on the screen 8 formed with the wallpaper. (The display processes will be described later in details with reference to a flow chart).

The memory 12 temporarily stores programs, such as application programs, and various types of data derived from the processes. The storage unit 13 is, for example, a HDD (hard disk drive) and stores programs such as application programs, created image files, and management tables, which will be described later, characteristically found in Embodiment 1.

The printer 14 is, for example, an ink-jet color printer, and prints out portions of the created image file, that is the background image serving as wallpaper, to form a screen. This printer can do ink-jet printing on a sheet with sides of a few meters.

The input device 15 includes a keyboard, a mouse, a scanner and other types of input devices, and is operated by an operator to start the image processor 1, create image content, and print and display the content. The display device 16 displays images of image files necessary for the process of creating and displaying image files and the process for outputting an image of a stage image file to the printer 14, and also displays the operation guides of the processes.

The projector output control unit 171 controllably transfers the projection image processed by the image file display processing section 1104 to the projector 181.

The projector 181 is a commonly used optical projection apparatus that can project projection images onto the screen 8 with sides of a few meters. The screen 8 is a projection screen formed on, for example, a wall of a building and a store. The present invention is characterized in that the projection images are projected by the projector 181 onto the screen 8 that is formed by affixing wallpaper with sides of a few meters on a wall of a building, the wallpaper being printed out from the printer 14. This allows the projection image, which is thrown on the background image of the wallpaper serving as the screen 8, to be displayed while being composited (superimposed) with the background image. Since the projection image is changeable under control of the image file display processing section 1104, an audience (passengers, shop customers, etc.) can enjoy the wallpaper with the stationary background image and projection images composited with the background image on the wallpaper.

FIG. 2 shows composition of a background image and a projection image.

In FIG. 2, (X) indicates a stage image that is a background image forming a screen 8 and also is an image of a stage image file (simply referred to as "stage image"). This stage image is printed out by the printer 14 into an image printed matter with sides of a few meters, and the printed matter is affixed on a wall of a building or the like to form a screen 8. Alternatively, the screen 8 can be formed by directly printing the stage image on the wall by an ink-jet printer 14 or by transferring the image printed by the printer 14 onto the screen 8. Other possible formations of the screen 8 include that a painter or the like perfectly copies the image printed by the printer 14 onto a wall to be a screen.

The projection image denoted by (Y) is an image projected from the projector 181 to the screen 8 and may be sometimes referred to as "scene image". The file of the scene image may be also sometimes referred to as a "scene file". The projection image covers areas other than the black-filled background image. Creation of the projection image is made through distinctive processing steps. The projection image is a composite of images of a plurality of layers. A scene file is created in consideration of the order of the plurality of images in a front-to-back direction and the order of the images with respect to the background image in the front-to-back direction. In the example of FIG. 2, a horse is placed behind the center tree of three trees, apples are placed on branches of the center and right trees, a bee is placed in front of the house, and letters "GOOD" are placed on a sign, thereby ultimately applying three-dimensional effects to the projection image projected on the background image with respect to the background image or another projection image. This will be described later in details with reference to FIG. 3.

The image (Z) is a composite image formed on the screen 8. On the background image formed on a wall of a building or the like, the projection image projected from the projector 181 is superimposed. As shown in FIG. 2, the displayed composite image includes the horse walking behind the center tree, the apples hanging on the center and right trees, the bee flying in front of the house, and the sign with "GOOD". The images arranged in the proper order in a front-to-back direction can give a three-dimensional view to the audience.

Figure 3:
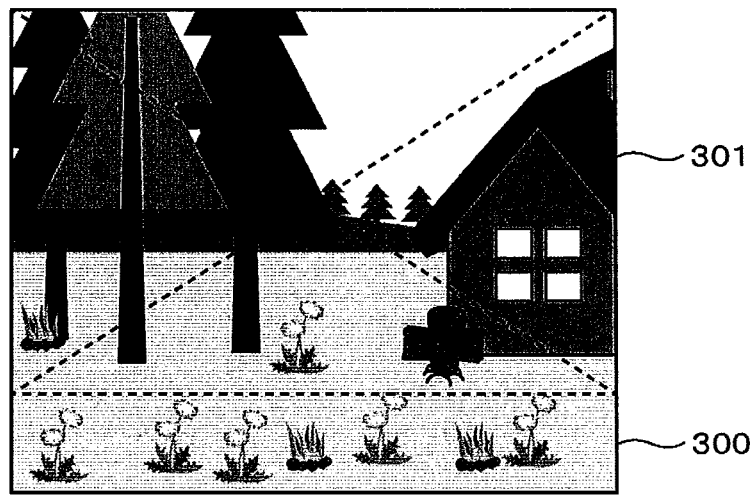
FIG. 3 illustrates the relationship between a cropped portion of the projection image and the background image according to Embodiment 1.

FIG. 3 shows the relationship between a cropped portion of a projection image and the background image.

In Embodiment 1, the projection image is a portion 301 cropped from the background image 300. Specifically, the background image is displayed on a screen of the display device 16, the portion 301 is specified by operating the input device 15 and the image in the portion 301 is cropped. The cropped image is stored in the memory 12 and used to create a scene file.

The image printed by the printer 14 covers the entire background image; however, the image portion (rectangle part) 301 cropped from the background image is processed to create a scene file that applies three-dimensional effects to the image of the cropped portion 301. The image (projection image) of the scene file is projected from the projector 181 onto the background image 300.

Cropping the image portion to be rendered into a three-dimensional image to the audience, instead of using the entire background image, and creating a scene file based on the cropped image can save the memory space to be used during the file creation processes and can reduce the image processing time required by the image file creation processing section 1102 and other loads.

Figure 4:
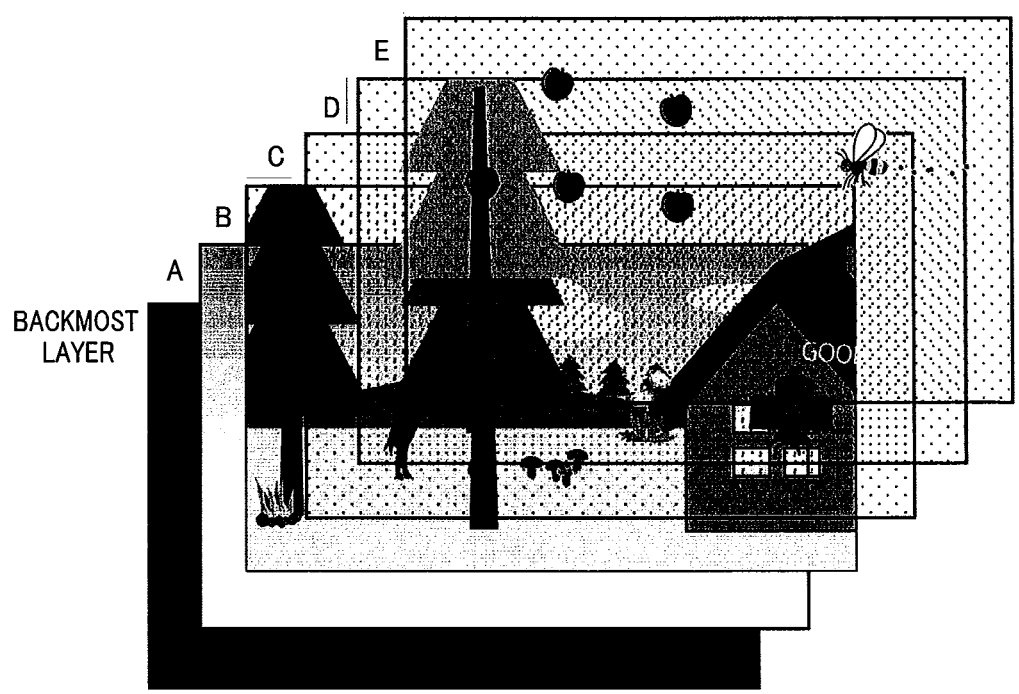
FIG. 4 depicts a plurality of layers stacked on one another, the layers making up a stage image and a scene image, according to Embodiment 1.
Figure 5:
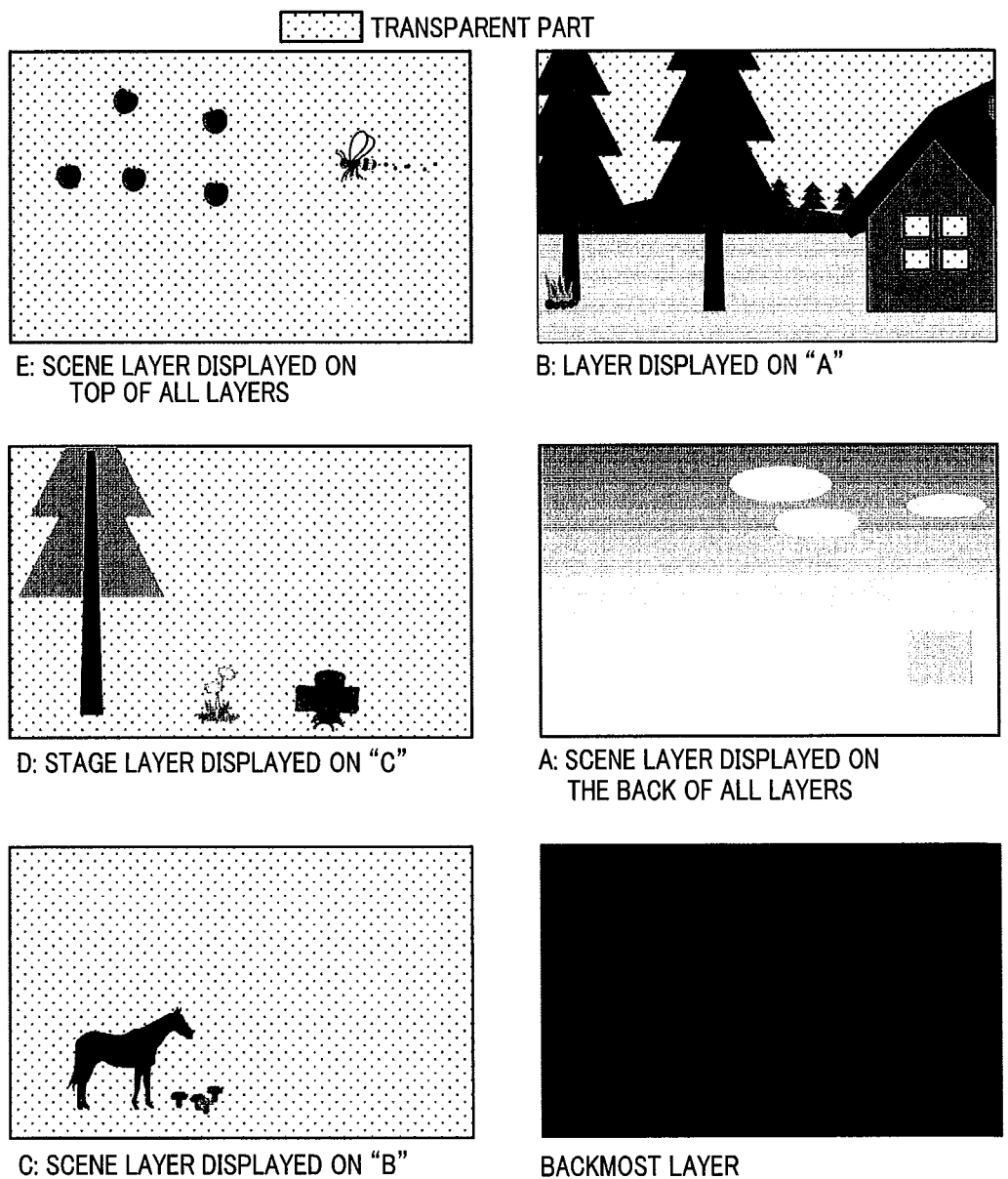
FIG. 5 depicts images of the respective layers that make up a stage image and a scene image according to Embodiment 1.

FIGS. 4 and 5 show images of a plurality of layers making up a stage image and a scene image.

FIG. 4 shows the images of the layers stacked on one another, while FIG. 5 shows each image of the layers.

In Embodiment 1, images of five layers (A) to (E) are created to create a scene file. Since a black layer is placed at the back of the five layers during the creation processes of the scene file, the total number of the layers becomes six. The backmost layer is a layer included in the scene image and positioned behind all the layers.

Referring to FIG. 5, descriptions will be made about the images of the five layers, but not the backmost layer.

In the illustrations, (A), (C) and (E) are scene layers, while (B) and (D) are stage layers. The images (scene layer images) of the scene layers (A), (C) and (E) include moving images and changing images such as clouds, a horse, and a bee. The scene file is created by compositing these images.

The images (stage layer images) of the stage layers (B) and (D) are generally stationary objects, such as a house and trees, and therefore include the same images in the stage image. Specifically, the stage layer images (B) and (D) make up part of the stage image and also are used to align the background image and projection image as described later.

The reason why the stage image is divided into two stage layers (B) and (D) is to display the image (horse image) of the scene layer (C) between the stage layers (B) and (D) to apply perspective to the scene image. Although it is technically possible to merge the images of the stage layer (D) with the images of the stage layer (B) into a single stage layer without creating the stage layer (D), the horse image of the scene layer (C) is displayed on the image on the only one stage layer (B), which fails to apply perspective.

Alternatively, although FIG. 5 shows two stage layers (B) and (D), the number of the stage layers is not limited thereto and can be three or more. For example, the stage layer (B) can be further divided into a layer (B-1) representing only a house, layers (B-2) and (B-3) each representing one of the two trees, and a layer (B-4) representing a mountain situated behind the trees and the ground. In this case, the scene layers can be placed between respective stage layers (B-1) to (B-4). For example, the scene layer (E) is divided into a plurality of scene layers, such as a layer with a bee image and a layer with an apple image. The divided scene layers can be interposed between the respective stage layers (B-1) to (B-4). Division of the layers can enhance the three-dimensional appearance of the final composite image of the background image and the projection image.

With reference to FIGS. 7 to 8, the structure of management tables used in Embodiment 1 will be described.

FIG. 7 shows the structure of a layer management table.

The layer management table is used to manage layers including the stage layers and scene layers in the process of creating an image file. This management table contains image content identification names, layer names, stage-layer specification flags and scene-layer specification flags. The images of the corresponding layers are stored in the storage unit 13.

The layer name is assigned to the layers divided based on the images cropped as a projection image. In the case of FIG. 4, the number of the layers is five, i.e., (A) to (E). The layer names (B) and (D) serving as stage layers have stage layer flags of "1". The layer names (A), (C) and (E) serving as scene layers have flags of "1".

If the number of the layers increases, the line of the tables is increased according to the increased number of the layers to assign the layer names, flags and other fields.

FIG. 8 shows the structure of a content management table.

The content management table is used to manage stage files, created position files and scene files. A stage file name for specifying a stage file representing a background image, a position file name for specifying a position file used to align a projection image with a background image, and a scene file name for specifying a scene file representing a projection image are registered in the content management table for each image content item.

The images of the corresponding files are stored in the storage unit 13.

With reference to FIG. 6, operation for creating a stage image file and a scene image file will be described. Also, exemplary images of layers shown from FIG. 9A to FIG. 9C will be referred to.

The operation is executed by the image file creation processing section 1102.

First, an operator controls the input device 15 to retrieve an original image previously stored in the storage unit 13 (S601). The original image is displayed on a screen of the display device 16. Then, the operator controls the input device 15 to crop a portion corresponding to a stage image ((X) in FIG. 2) from the original image, thereby creating a stage image file (S602). Note that the entire original image can be used as the stage image. The created stage image file is assigned with a stage image file name "stage P" and stored in the storage unit 13. Subsequently, the stage image file name "stage P" is registered in the content management table.

Next, the operator controls the input device 15 to define a portion 301, which will be a projection area in the stage image, and crops the image in the portion (S603). The cropped image is temporarily stored in the storage unit 13. The operator then controls the input device 15 to create a plurality of layers (five layers in Embodiment 1) with images based on the cropped image and assigns layer names (A) to (E) to the respective layers (S604). Each layer name is registered in the layer name field of the layer management table (S621). The images of the five layers are temporarily stored in the storage unit 13. The number of the layers to be created is determined based on the number of portions that are standing still (nonmoving images) in the stage image and portions that are moving (moving images), whether the nonmoving images are rendered on the same image plane or on different image planes, and whether the moving images are rendered on the same image plane or a different image plane. In this embodiment, the bee, horse and clouds are regarded as moving images (three layers (A), (C), (E)), while the nonmoving image is divided into two layers ((B) and (D)), and the horse is placed between (B) and (D) to apply three-dimensional effects.

Next, the operator controls the input device 15 to specify the layers (B) and (D), from the five layers, as stage layers and write "1" in the stage layer flag field of the layer management table (S605, S622). In addition, as shown in FIG. 9A, the images of the stage layers (B) and (D) are subjected to rendering (turning the images into a collection of pixels) to create a position file (S606). The created position file is stored in the storage unit 13 (S607), and the position file name "position P" assigned to the position file is registered in the content management table (S608). The image of the position file is projected by the projector 181 onto the projection area to align the projection image with the background image (the alignment process will be described later with reference to (P) in FIG. 11).

Next, creation of a scene file will be described.

The layers (A), (C) and (E) in the layer management table are specified as scene layers, and the scene layer flags corresponding to the layers are changed to "1" (S609).

As shown in FIG. 9B, images of all the layers are retrieved from the storage unit 13 and displayed on the display device 16, and the images of the stage layers (B) and (D) are blackened like the backmost layer (S610). In other words, the images of the stage layers (B) and (D) are used as masks of the images of the underlying scene layers. As shown in FIG. 9C, the blackened stage layers (B), (D) and the scene layers (A), (C), (E) are stacked on one another while maintaining the positional relation in the top-to-bottom direction and subjected to rendering to create a scene file (S611). The image of the scene file includes the images of stage layers filled with black and the images of the scene layers filled with full color. The image of the created scene file is stored in the storage unit 13 (S612). Then, the scene file name "scene P" is assigned to the scene file and registered in the content management table (S613).

As described above, the storage unit 13 stores the created stage file, position file and scene file, and the names of these files are registered in the content management table. In this manner, the background image, the projection image, and the position image used for positioning are prepared.

Figure 10:
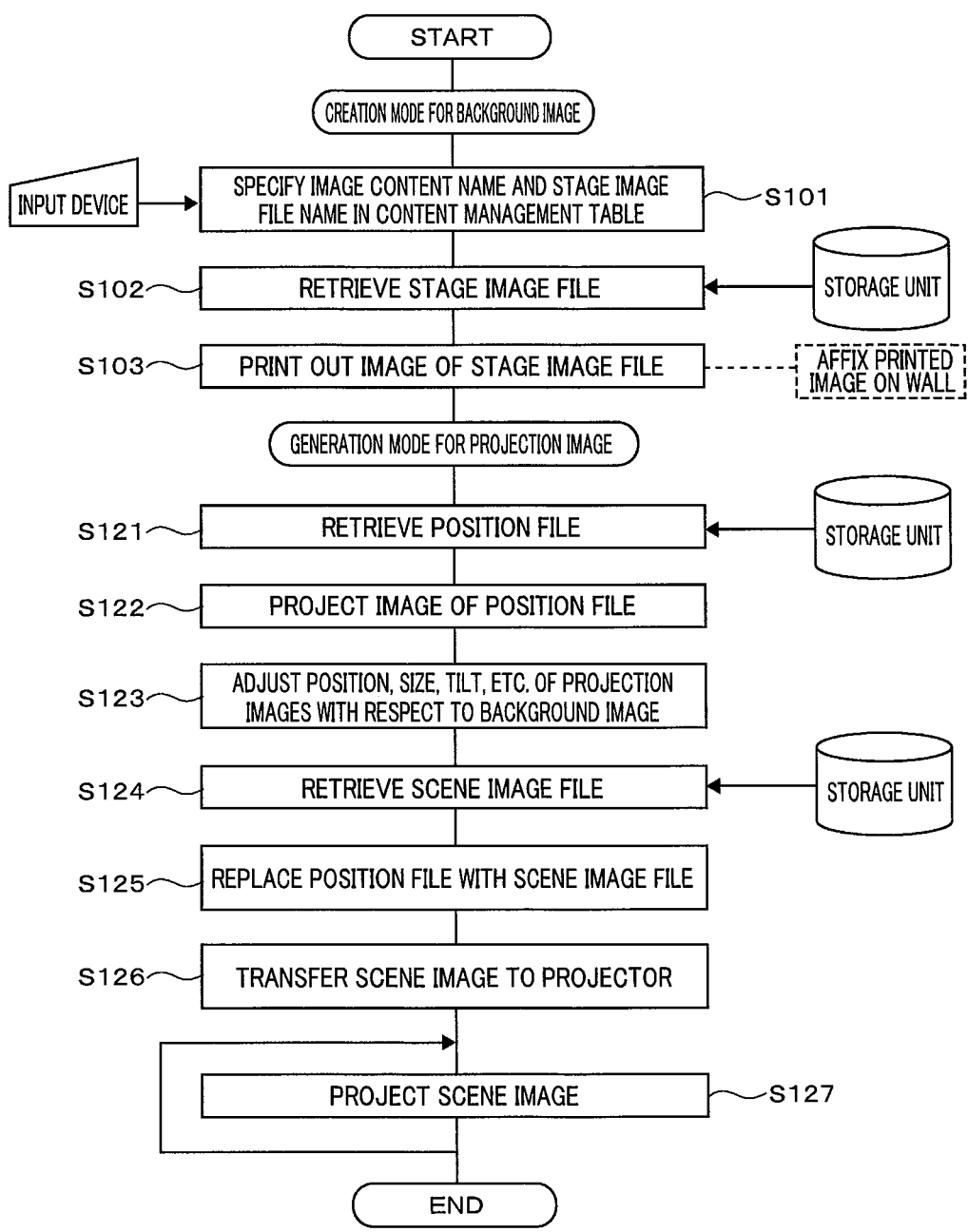
FIG. 10 is a flow chart showing the steps of creating a background image and the steps of generating a projection image according to Embodiment 1.

With reference to FIG. 10, the operation of printing a background image and projecting a projection image will be described. Specifically, a process of creating a background image from a stage file (background image creation mode), and a process of generating a projection image from a scene file (projection image generation mode) subsequent to the background image creation mode will be described.

In the background image creation mode, an operator first controls the input device 15 to specify a content name and a stage image file name in the content management table (S101). This operation retrieves the stage image stored in the storage unit 13 and displays the stage image on the display device 16 (S102).

When the operator controls the input device 15 to start printing the stage image, the image file print processing section 1103 starts processing to transfer the image of the stage image file to a printer 14 that prints out the image in color (S103). The printed image serving as wallpaper is affixed on a wall of a building or the like by the operator to form a screen 8 (see (X) in FIG. 11).

Next, the image file display processing section 1104 starts operation of the projection image generation mode.

When the operator controls the input device 15 to specify a content name and a position file name "position P" in the content management table, the corresponding position file stored in the storage unit 13 is retrieved and the image of the position file is displayed on the display device 16 (S121). Under control of the projector output control unit 171, the image of the position file (referred to as a position image) is transferred to the projector 181 to be projected onto the screen 8 (S122). The position image is projected onto a portion 301 of the stage image, the portion 301 being cropped in an early stage from the background image forming the screen 8. However, the position image may sometimes deviate from the portion of the stage image due to a tilt of the projector 181, the projecting direction or other factors ((Z') in FIG. 11). For proper alignment, the position, size and tilt of the position image projected with respect to the background image are adjusted (S123). This adjustment is made by the operator by moving the position and direction of the projector 181, changing the size of the projected position image through zoom adjustment, adjusting the focus, and other operations.

After judging that the misalignment of the projected position image with the stage image is compensated for, the operator controls the input device 15 to specify a scene file name "scene P" in the content management table so that the image file display processing section 1104 retrieves the scene file from the storage unit 13 (S124). The retrieved scene file is replaced with the position file and displayed on the display device 16 (S125). The scene image is transferred through the projector output control unit 171 to the projector 181 (S126). The projector 181 projects the scene image onto the portion of the stage image that has been aligned with respect to the background image.

As described above, the stage image is superimposed on the background image of the wallpaper without misalignment, thereby forming a composite image of both the stage image and the background image ((Z) in FIG. 2).

Embodiment 2

Figure 12:
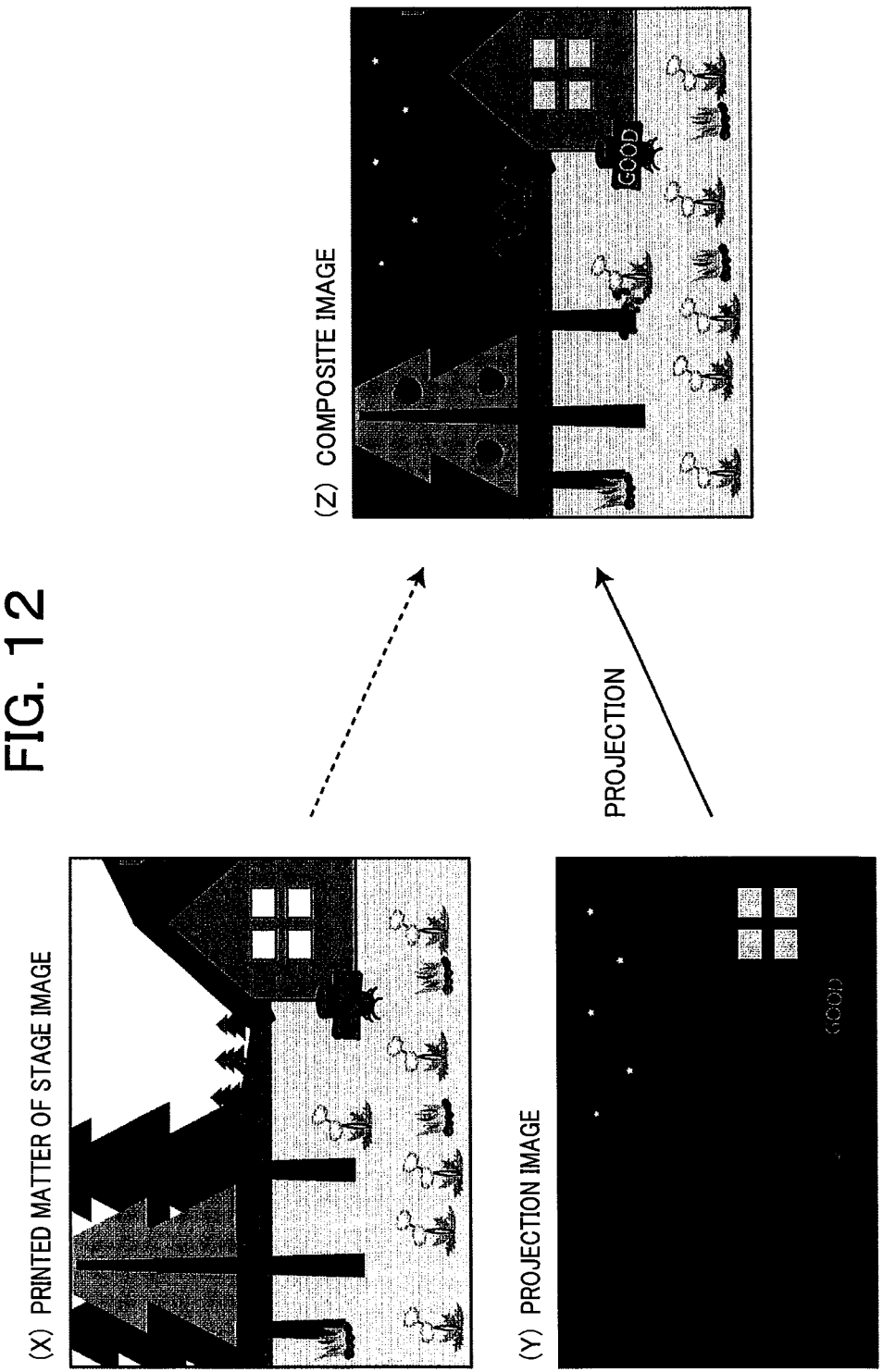
FIG. 12 shows composition of a background image and a projection image according to Embodiment 2.

Embodiment 2 has been made based on Embodiment 1. In Embodiment 2, a plurality of scene files, which are projection images to be projected to the same area, are prepared and successively interchanged (replaced) to change the projection image. FIG. 12 shows an example in which, when night comes (e.g., 6 p.m. to 6 a.m.), the projection image shown in FIG. 2 is replaced with a projection image (Y) for night.

In order to achieve Embodiment 2, the central processing unit 11 includes a timer (software timer or the like) and interchanges the scene files when the timer counts a fixed amount of time or at fixed time intervals. Unlike Embodiment 1, a nighttime scene file is required to be added and therefore the number of the scene layers increases to create the nighttime scene file.

Specifically, as shown in the layer management table of FIG. 14, nighttime scene layers (A-2), (C-2) and (E-2) are registered in addition to the scene layers (A-1), (C-1) and (E-1) of the scene file for daytime created in Embodiment 1, and time frames as a condition for interchange are recorded in a comment field of the layer management table. The nighttime scene layer (A-2) contains a starry sky image that has been changed from the clouds in day time, the layer (C-2) contains an image without the horse, and the layer (E-2) contains an image without the bee.

The image file creation processing section 1102 renders the images of the scene layers (A-2), (C-2), (E-2) to create an image (projection image) of a scene file as shown in (Y) of FIG. 12. The created scene file is stored in the storage unit 13. As shown in the image content management table of FIG. 15, a nighttime scene file name "nighttime P1" is added to the daytime scene file name "daytime P1" and registered together.

Figure 13:
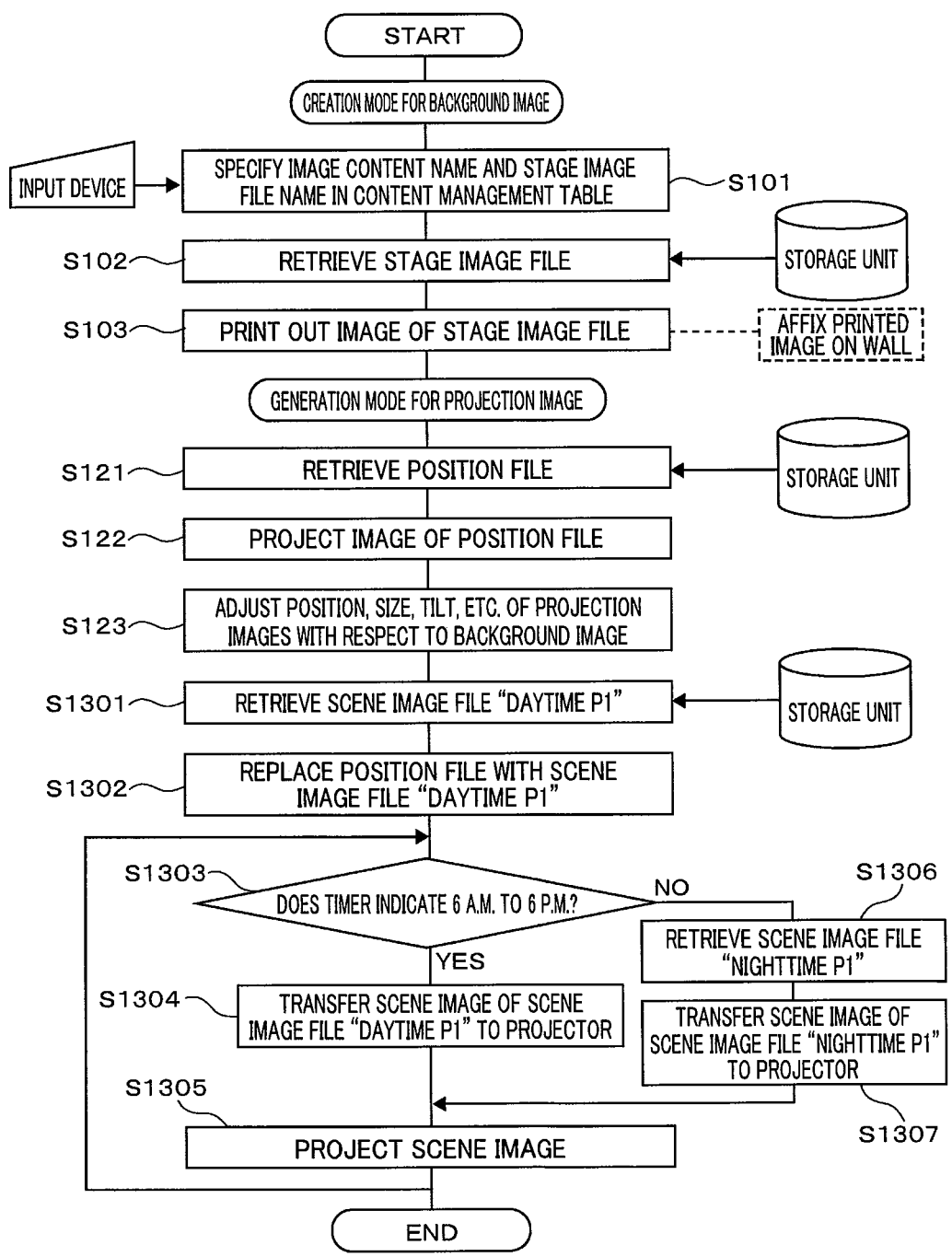
FIG. 13 is a flow chart showing the steps of creating a background image and the steps of generating a projection image according to Embodiment 2.

With reference to FIG. 13, operation of generating a projection image from a scene file will be described. Note that the operation steps include the same steps as those of the background image creation mode and as from the first step to the alignment step (up to step (S123)) of the scene image display mode in Embodiment 1 shown in FIG. 10, and therefore the explanation thereof will not be reiterated.

After completion of alignment of the projection image, under the control of the image file display processing section 1104, the operator controls the input device 15 to specify a scene file name "daytime P1" in the content management table. In response to the specification, the image file display processing section 1104 retrieves the scene file from the storage unit 13 (S1301). The retrieved scene file is replaced with the position file (S1302). Then, it is determined whether the timer indicates daytime (6 a.m. to 6 p.m.) (S1303). If the determination result shows daytime, the image of the scene file "daytime P1" is transferred to the projector 181 via the projector output control unit 171 (S1304), and the projector 181 projects the scene image onto a portion of the stage image that has been completely aligned with the background image (S1305).

If the result determined by the timer (S1303) shows nighttime, the image of the scene file "nighttime P1" is retrieved from the storage unit 13 and then transferred to the projector 181 via the projector output control unit 171 (S1307). The projector 181 projects the scene image onto the portion of the stage image that has been completely aligned with the background image (S1305).

From then on, with the time lapsed in the timer, the scene file "daytime P1" and the scene file "nighttime P1" are alternately retrieved from the storage unit 13, and the retrieved file is transferred to the projector 181 to be projected onto the background image in the same manner.

Embodiment 2 can be implemented in variously modified forms.

For instance, three or more scene files (e.g. four scene files) to be interchanged are prepared and automatically interchanged in succession at fixed time intervals (e.g., every four hours) for 12 hours from 8 a.m. to 8 p.m. This modification can change the projection image to, for example, an image with a horse eating grass at 8 a.m., an image with the horse lying under a tree at noon, an image with the horse drinking water at 4 p.m., or the like.

In another application, Embodiment 2 can be applied to limited-time sales at supermarkets, hamburger chain stores or other stores. Specifically, decorative or advertisement wallpaper (corresponding to the stage image in FIG. 2) is affixed on a wall of a store. A specific scene file (e.g. an image of a specific set of a hamburger and a drink), which makes up a projection image, is combined with a projection image and the combined image is projected from the opening of the store until 2 p.m. Then, the combined image is automatically replaced with a scene file representing another menu at 2 p.m. to inform customers of the start of a limited-time sale.

In addition, Embodiment 2 can be used to project images on wallpaper of a store, such as a café bar, whose business style changes between daytime and nighttime. Without changing the image of the wallpaper in the store, it is possible to readily change the atmosphere of the store by partially interchanging the image content items between daytime and nighttime.

In yet another application, Embodiment 2 can be applied to event sites and amusement facilities. For example, wallpaper with an image of a Christmas tree is installed, and images of illumination are projected on the wallpaper. By proper interchange of scene files over time, the illumination images can change as if the tree lights are turned on at night.

Embodiment 3

In Embodiment 3, a plurality of projectors project projection images onto a plurality of areas in a background image, respectively, and form composite images at the areas.

Figure 16:
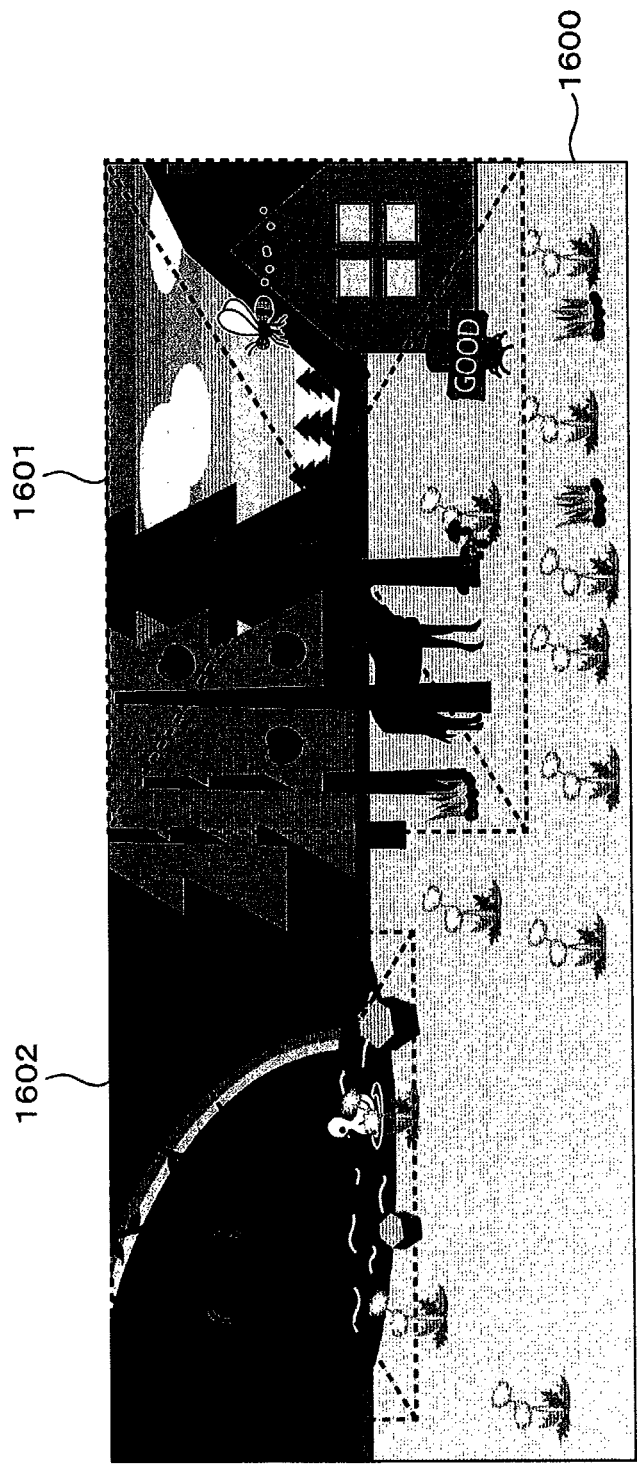
FIG. 16 depicts a final composite image and the relationship between the composite image and projection areas according to Embodiment 3.

FIG. 16 illustrates the relationship between a final image 1600 and a plurality of projection areas. Two projection areas 1601, 1602 are set on the composite image 1600. Two projectors independently project scene images onto the projection areas 1601, 1602, respectively. The projection areas 1601, 1602 are equivalent to image portions cropped to create scene files and position files.

Figure 17:
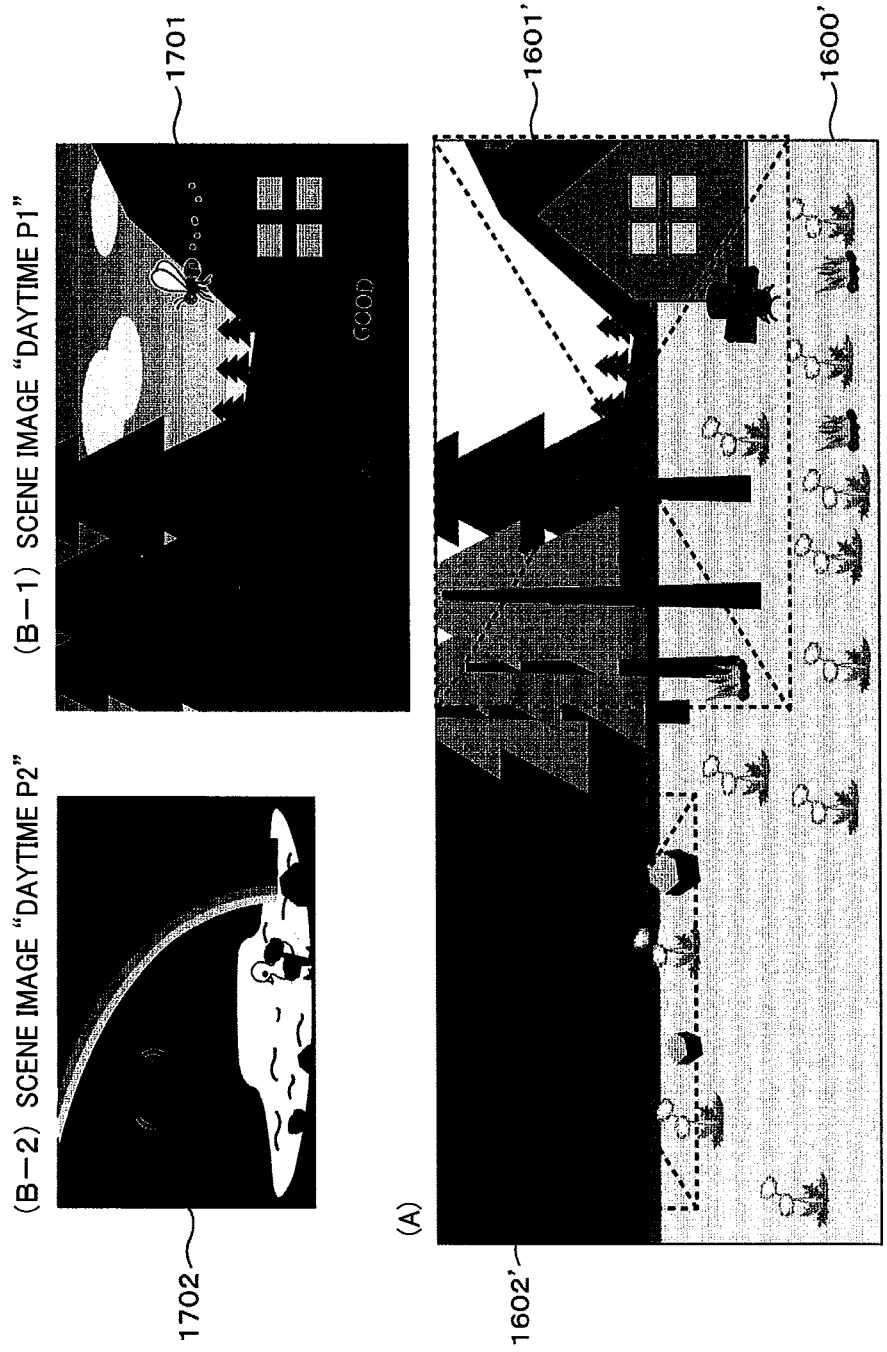
FIG. 17 depicts a stage image and scene images according to Embodiment 3.

As shown in FIG. 17, a stage image and scene images 1701 and 1702 are created. The stage image forms a background image 1600', while the scene images 1701 and 1702 are projected respectively onto the projection areas 1601 and 1602 (position image portions 1601', 1602') set on the background image 1600'. In this embodiment, the scene image 1701 for the projection area 1601 is the same as that in Embodiment 1; however, the scene image 1702 for the projection area 1602 represents a duck in a pond.

The files of the scene images 1701 and 1702 and the position file thereof are created through the same processing as Embodiment 1, and therefore the explanation thereof will not be reiterated.

In the case of Embodiment 3, wallpaper serving as a background image can be formed by a single printing operation of a common stage image ((A) in FIG. 17) by the printer 14.

Figure 18:
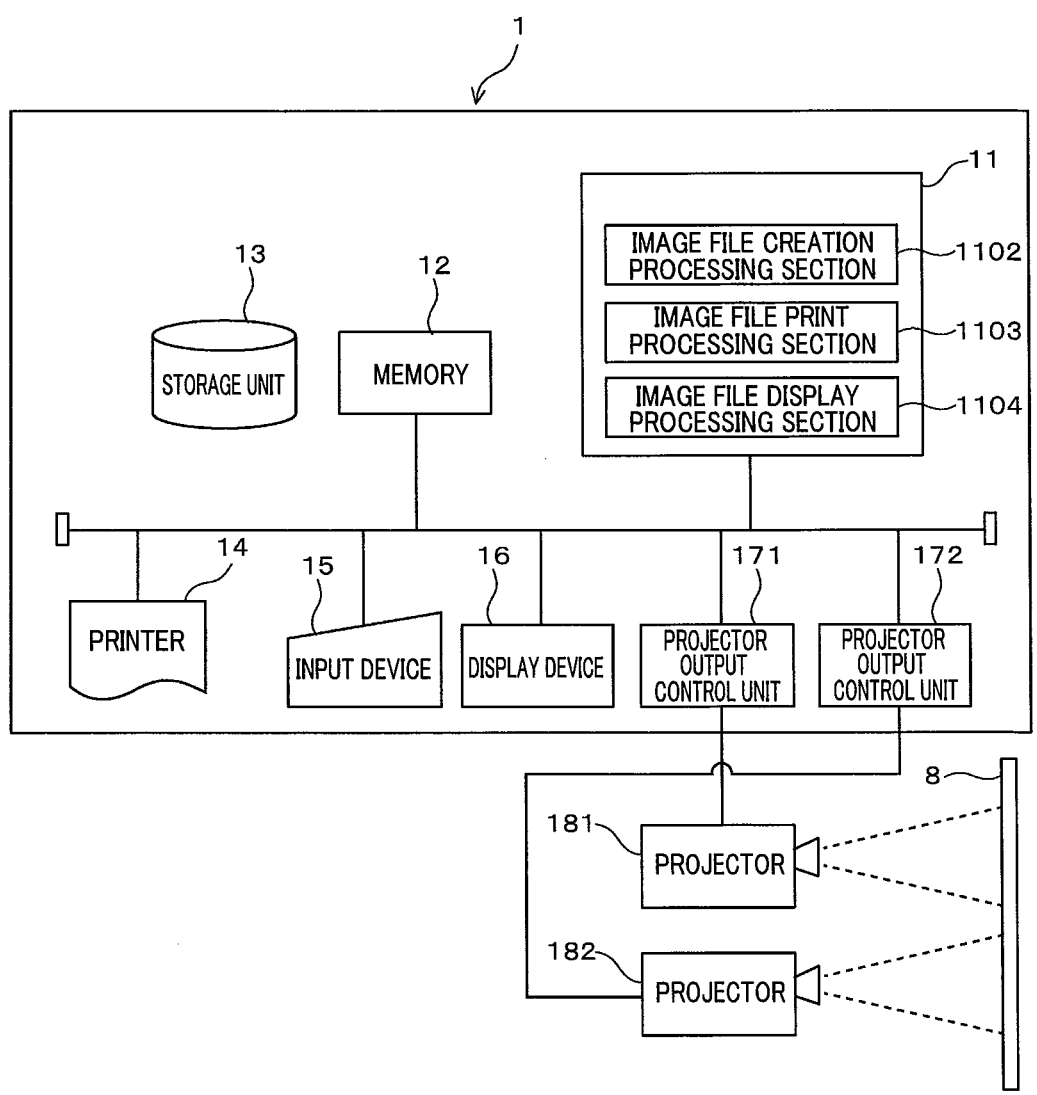
FIG. 18 illustrates the configuration of the entire image content display system according to Embodiment 3.

FIG. 18 illustrates the configuration of the entire image content display system.

In addition to the projector output control unit 171 and the projector 181 of the display system shown in FIG. 1, this display system further includes a projector output control unit 172 and a projector 182. Specifically, the projector 181 projects images onto a projection area 1601 (position P1), while the projector 182 projects images onto a projection area 1602 (position P2).

FIG. 19 shows an exemplary structure of a content management table.

In this example, two position files "position P1" and "position P2" are prepared for two projection areas 1601, 1602 in a single stage image "stage P". Incorporating the invention of Embodiment 2, Embodiment 3 prepares daytime scene files "daytime P1", "daytime P2" and nighttime scene files "nighttime P1", "nighttime P2" for each position. Then the projection images to be projected onto the projection area 1601 and the projection area 1602 are interchanged at the same intervals (every 12 hours) between daytime and nighttime.

If there is no need to incorporate the invention of Embodiment 2, the nighttime scene files "nighttime P1" and "nighttime P2" are unnecessary.

Figure 20:
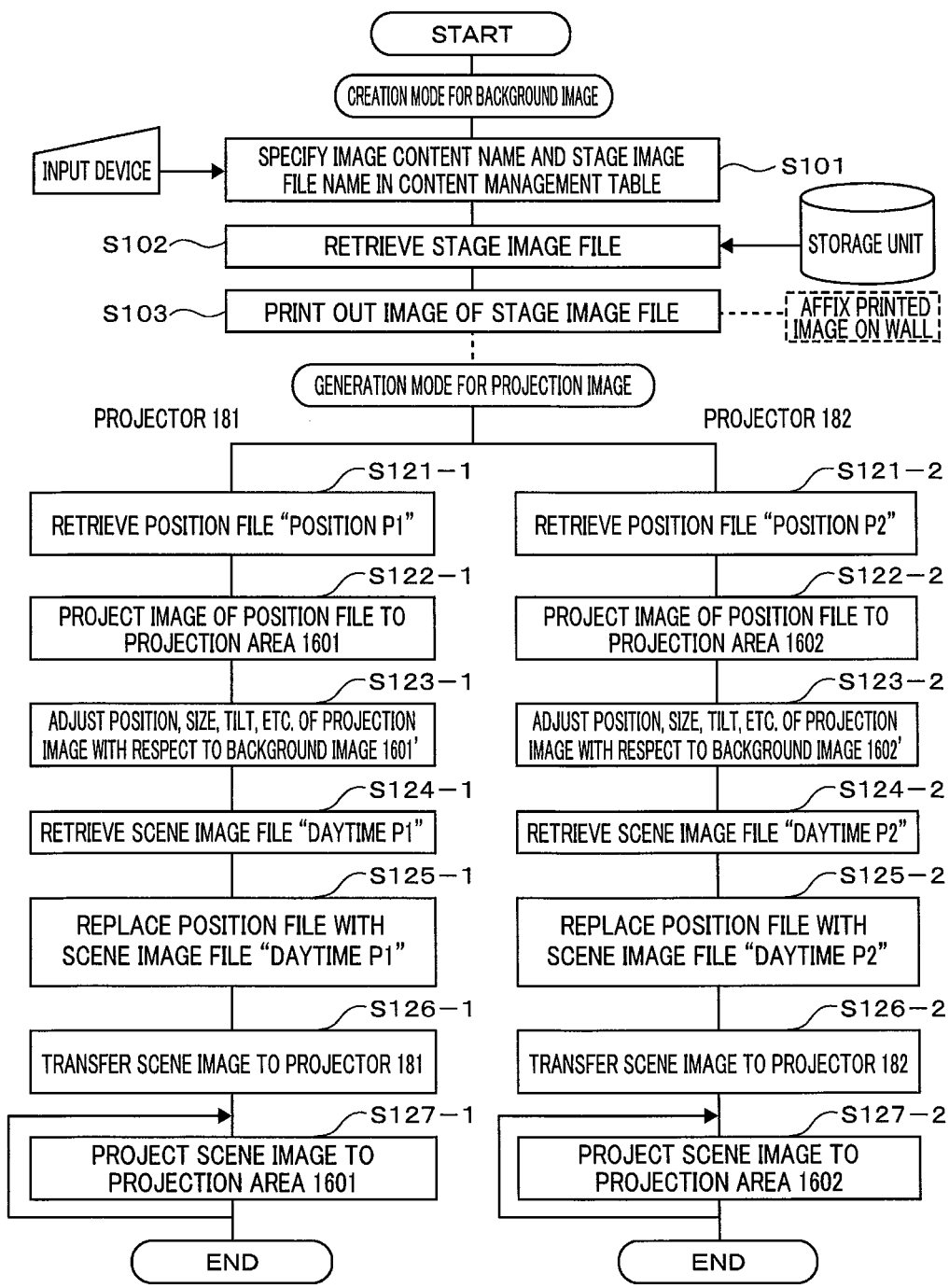
FIG. 20 is a flow chart showing the steps of creating a background image and the steps of generating a projection image according to Embodiment 3.

With reference to FIG. 20, operation of creating a background image and generating a projection image will be described.

The common background image 1600' is created through the same processes (S101 to S103) as those of Embodiment 1 (FIG. 10).

Note that the operation from the step of creating the position file "position P1" for the projector 181 (S121-1) to the step of projecting the scene image "daytime P1" onto the projection area 1601 (S127-1) is the same as Embodiment 1 (FIG. 10).

In addition, note that the operation from the step of creating the position file "position P2" for the projector 182 (or for the projector 181) (S121-2) to the step of projecting the scene image "daytime P2" onto the projection area 1602 (S127-2) is also the same as Embodiment 1 (FIG. 10).

Embodiment 3 allows a plurality of projection images to be independently projected on a common background image as a screen in order to display composite images.

Embodiment 3 can also be implemented in variously modified forms.

For instance, in conjunction with Embodiment 2, the display system of Embodiment 3 can interchange the scene images for the projection area 1601 and the scene images for the projection area 1602 at different time intervals. This can be implemented in conformity with Embodiment 2 by appropriately changing conditions of the content management table in FIG. 19.

In another modification, the content to be projected to one of the projection areas (e.g., projection area 1602) can be a moving image or video instead of still images. Of course, it is possible to project moving images or video as projection images onto both the projection areas 1601 and 1602.

In yet another modification, the screen 8 does not need to be flat. In the case of a wall with a right angle corner, wallpaper printed from the stage image is bent at the center thereof and is then affixed along the right angle corner of the wall, thereby readily forming a screen with a right angle corner. For the bent screen, the projector 181 for the projection area 1601 and the projector 182 for the projection area 1602 are placed so that they can project images onto the target projection areas, respectively, from the different directions.

In yet another modification, the screen 8 can be formed on a parallelepiped column or an exhibit or a formed object having a front side and a back side. In addition, the number of the projectors is not limited to two, and three or more projectors can be used. In this case, functions for creating scene files and position files and functions for displaying the images need to be increased according to the number of the projection areas. For instance, when a large square pole with sides of a few meters is used as a screen, the square pole is surrounded by wallpaper with a background image printed thereon so as to form projection areas (four projection areas) on four side faces, and projectors (four projectors) are placed so as to project images onto the four side faces of the square pole, respectively. Composite projection images can be displayed around the square pole by projecting individual scene images from the projectors corresponding to the respective projection areas.

This specification has so far described Embodiments 1 to 3 of the present invention; however, the present invention can be further modified into various forms and implemented in various applications.

In the above-described embodiments, files of a background image and a projection image are created based on an original image. To create a projection image from an original image, a portion in the original image is cropped, and the image within the cropped portion is divided into image items rendered on a plurality of layers, resulting in stage layers and scene layers. However, the present invention is not limited to this. In another example, a stage image and a position image can be created based on a first original image and a scene image can be created based on another original image (a second to n-th original images) so as to match the projection area set in the stage image. To achieve this, the creator collects a plurality of desired images, creates scene layers with the images arranged in appropriate order in the up-to-down direction, and stacks the created scene layers on one another to create a file of the scene image.

Furthermore, there can be an eclectic idea of Embodiment 1 and the aforementioned example to create files of a background image and a projection image. Specifically, stage layers and scene layers (a first type of scene layers) are created from an original image as has been done in Embodiment 1, while a second type of scene layers are created from another original image. The second type of scene layers and the first type of scene layers are stacked on one another while maintaining the positional relation in the top-to-bottom direction to create a file of a scene image. For example, after creating the scene layers (A) to (E) as shown in FIGS. 4 to 5, a scene layer (F) with an image of a flying bird is added on the scene layer (A), a scene layer (G) with an image of a flying butterfly is added between the scene layer (E) and the stage layer (D), thereby creating a scene image including all of the scene layers.

In the above-described embodiments, the screen is formed on a wall of a building or a store as an example. However, the present invention is not limited thereto. The screen can be an exhibited vehicle or sculpture or a slowly-moving object. In the case of the moving object, the projector is controlled to move the projection image along with the motion of the projection area of the background image.

In the above-describe embodiments, the image processor 1 is implemented by a computer such as a PC and a server. In another modification, it is possible to separately perform a process for creating the image file and processes for printing and displaying the created image file, all having been performed by the image processor 1. For instance, the processes for creating and printing the image files can be performed by a computer such as a PC and a server, as with the case of the aforementioned embodiments and the process for displaying the image file can be performed by a DVD player. In this case, the DVD player needs to include a projector output control unit 171, as a precondition, for connecting the DVD player and the projector. The DVD player into which an optical disc with a created stage image file, a position file and one or a plurality of scene image files stored is inserted is controlled to enable projection and display of the files on the screen.

The process of printing background images does not need to be done by the PC that has created the image file, but can be done with another printer.

In yet another application, the image processor 1 does not need to be always installed near the projector 181. For example, an image display system can be implemented by connecting the image processor 1 and the projector 181 (or a DVD player in the above modification) via a network such as the Internet. In this case, the image processor 1 and the projector 181 (or a DVD player in the above modification) are required to have a communication function to transmit and receive image files and their own IP addresses or the like, respectively.

It is also possible to connect a single image processor 1 with a plurality of DVD players and computers via a network in order to project images onto screens by projectors connected with the DVD players and the computers. For example, an image processor 1 is installed at a home or head office, while wallpapers of a background image are affixed on a wall of a plurality of branch offices. The image processor 1 at the home office delivers a scene file at regular intervals to the DVD players or the computers at the branch offices, thereby projecting the same image on screens from the plurality of projectors.

According to yet another modification, the image processor 1 does not need to deliver the same scene file to all the DVD players of the branch offices, but can deliver different scene files to the respective branch offices. For example, the image processor 1 can deliver a scene file "scene P" of landscape P (see FIG. 8) to a DVD player at a branch office among the plurality of branch offices, while delivering a scene file "scene Q" of landscape Q to a DVD player at another branch office.

What is claimed is:

1. A content display system in which a projector projects image content or video content to display the content on a screen, comprising:
   a creation processing unit creating first display content serving as the screen and creating second display content being projected by the projector onto a predetermined area of the first display content, the first display content and second display content being arranged while maintaining their visual relationship;
   a storage unit storing the first display content and the second display content created by the creation processing unit;
   a display processing unit retrieving the second display content from the storage unit and providing the retrieved second display content to the projector; and
   the projector projecting the second display content provided by the display processing unit onto the predetermined area of the first display content,
   wherein the creation processing unit creates third display content that includes the display content in the predetermined area of the first display content,
   the storage unit stores the created third display content,
   the display processing unit retrieves the third display content stored in the storage unit and transfers the third display content to the projector,
   the projector projects the obtained third display content to the predetermined area of the first display content,
   the display processing unit further retrieves the second display content stored in the storage unit, replaces the third display content with the second display content, and transfers the second display content to the projector, and
   the projector projects the obtained second display content to the predetermined area of the first display content.

2. The content display system according to claim 1, wherein the creation processing unit creates a plurality of display content items as the second display content,
   the storage unit stores the plurality of created display content items as the second display content, and
   the display processing unit selectively retrieves a display content item from among the plurality of display content items stored in the storage unit at fixed time intervals counted by a timer, and transfers the retrieved display content item to the projector.

3. The content display system according to claim 1, wherein the first display content has a first predetermined area and a second predetermined area set thereon,
   the creation processing unit creates fourth display content relating to the first predetermined area and creates fifth display content relating to the second predetermined area,
   the display processing unit transfers the fourth display content to a first projector and transfers the fifth display content to a second projector,
   the first projector projects the obtained fourth display content to the first predetermined area,
   the second projector projects the obtained fifth display content to the second predetermined area, and
   the fourth display content and the fifth display content are displayed on the first display content to form composite display content items.

4. The content display system according to claim 1, wherein the creation processing unit renders images of a plurality of layers making up the first display content to create images of stage layers making up the third display content, and
   the creation processing unit renders the images of the plurality of layers stacked on one another using the layers of the third display content as masks while maintaining their positional relationship in the top-to-bottom direction to create images of scene layers making up the second display content.

5. A method for displaying content, the content being image or video display content projected by a projector to be displayed on a screen, the method comprising the steps of:
   creating first display content serving as the screen;
   creating second display content being projected by the projector onto a predetermined area of the first display content, the first display content and second display content maintaining their visual relationship; and
   forming composite display content of the second display content on the first display content by projecting the second display content onto the predetermined area of the first display content from the projector,
   wherein a plurality of display content items are created as the second display content, and
   one of the display content items is selectively retrieved from among the plurality of display content items at fixed time intervals counted by a timer and the retrieved display content item is projected from the projector.

6. The method for displaying content according to claim 5, further comprising the steps of:
   setting a first predetermined area and a second predetermined area on the first display content;
   creating fourth display content relating to the first predetermined area and fifth display content relating to the second predetermined area;
   projecting the fourth display content from a first projector to the first predetermined area;
   projecting the fifth display content from a second projector to the second predetermined area; and
   forming composite display content of the fourth display content and the fifth display content on the first display content.

7. A method for displaying content, the content being image or video display content projected by a projector to be displayed on a screen, the method comprising the steps of:
   creating first display content serving as the screen;

creating second display content being projected by the projector onto a predetermined area of the first display content serving as the screen;

creating third display content that is made from display content in the predetermined area of the first display content;

projecting the third display content from the projector to the predetermined area of the first display content to compensate for misalignment; and replacing the third display content with the second display content to project the second display content to the predetermined area of the first display content.

8. The method for displaying content according to claim 7, wherein the first display content is printed out by a printer to form a printed matter, and the printed matter of the first display content is affixed on an object such as a wall, a building structure and an exhibit, to form the screen.

9. The method for displaying content according to claim 7,
wherein a plurality of display content items are created as the second display content, and
a display content item is selectively retrieved from among the plurality of display content items at fixed time intervals counted by a timer and the retrieved display content item is projected from the projector.

10. The method for displaying content according to claim 7, further comprising the steps of:
setting a first predetermined area and a second predetermined area on the first display content;
creating fourth display content relating to the first predetermined area and fifth display content relating to the second predetermined area;
projecting the fourth display content from a first projector to the first predetermined area;
projecting the fifth display content from a second projector to the second predetermined area; and
forming composite display content of the fourth display content and the fifth display content on the first display content.

11. The method for displaying content according to claim 7,
wherein the third display content includes images of stage layers obtained by rendering images of a plurality of layers making up the first display content, and
the second display content includes images of scene layers obtained by rendering images of a plurality of layers stacked on one another using the layers of the third display content as masks while maintaining their positional relationship in the top-to-bottom direction.

* * * * *